W. C. WEST.
ANTISEPTIC DRINKING FOUNTAIN.
APPLICATION FILED NOV. 7, 1912.
1,099,002.
Patented June 2, 1914.
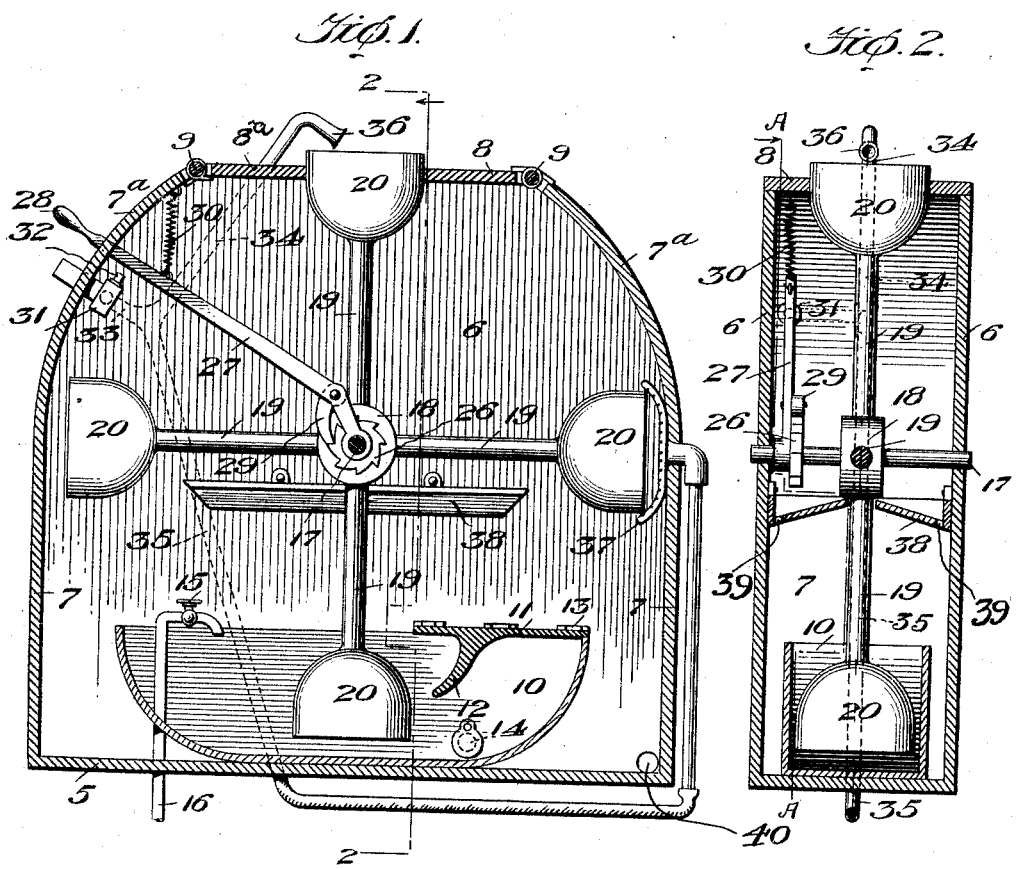
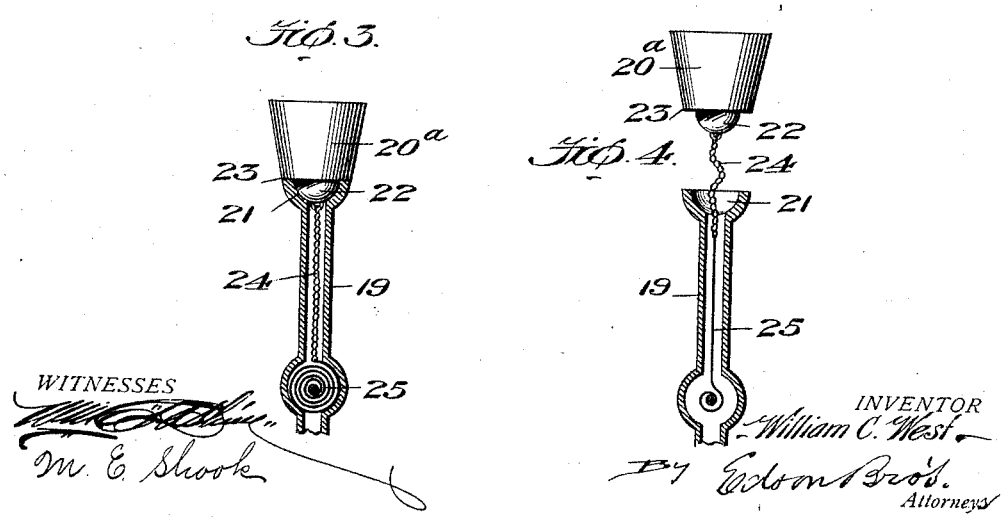
WITNESSES
INVENTOR
William C. West
By Edson Bros.
Attorneys

UNITED STATES PATENT OFFICE.

WILLIAM C. WEST, OF KANSAS CITY, MISSOURI.

ANTISEPTIC DRINKING-FOUNTAIN.

1,099,002. Specification of Letters Patent. Patented June 2, 1914.

Application filed November 7, 1912. Serial No. 730,050.

*To all whom it may concern:*

Be it known that I, WILLIAM C. WEST, a citizen of the United States, residing at Kansas City, in the county of Jackson and State of Missouri, have invented certain new and useful Improvements in Antiseptic Drinking-Fountains; and I do hereby declare the following to be a full, clear, and exact description of the invention, such as will enable others skilled in the art to which it appertains to make and use the same.

This invention is a drinking fountain adapted more particularly for use at public places where it is desirable to sterilize the receptacles.

One object of the invention is to prevent the transmission of diseases ordinarily conveyed by the use of drinking receptacles at public fountains, now commonly employed for not only human beings but other animals, as well.

Another purpose in view is to compel the sterilization of a drinking receptacle prior to its being filled with the fluid, such as water, to be consumed, and thereby prevent the use of the same receptacle by two persons or animals without having passed that receptacle through a sterilizing process.

The invention further aims to provide a fountain which will not require the services of an attendant, except at infrequent intervals.

With these ends in view, the invention embodies a casing for the protection of a plurality of receptacles mounted upon a suitable revolving element, such as a shaft, for movement within the casing, each receptacle being successively dipped into an antiseptic solution confined within the casing, said receptacles being then flushed by a spraying nozzle, and thence brought into view of the consumer, and also into alinement with a charging nozzle.

The invention consists, further, in means, operable at will, whereby liquid from a plurality of nozzles may be simultaneously discharged toward, and into a plurality of receptacles.

Other objects and advantages of the invention will become apparent from the detail description thereof, taken in connection with the drawings.

In the accompanying drawings, I have illustrated one embodiment of the invention but the construction shown therein is to be understood as illustrative, only, and not as defining the limits of the invention.

Figure 1 is a sectional view taken on the line A—A of Fig. 2. Fig. 2 is a vertical, sectional view on the line 2—2 of Fig. 1. Fig. 3 is an enlarged detail sectional view of another embodiment of the drinking receptacle, when in its normal position. Fig. 4 is a view showing the receptacle removed from its supporting arm.

In the embodiment of the invention, illustrated in the accompanying drawings, I have shown a device provided with a casing having a bottom 5, side walls 6, and end walls 7. As shown in Fig. 1, a portion of the end walls are arcuate in form, as at 7ª, thereby leaving the top of the receptacle of less width than the bottom 5 thereof. The top of the receptacle is preferably closed by any suitable means, such as the hinged members 8 and 8ª secured to the top of walls 7ª. These members 8 are spaced apart a sufficient distance to permit a drinking receptacle, to be hereinafter described, to pass between, or protrude above, these members. The member 8 is adapted to be moved upwardly by the drinking receptacle to permit the latter to assume its upper vertical position, while the member 8ª is preferably moved downwardly into the casing by the forward movement of the drinking receptacle, after it has occupied its charging or filling position. If desired, the parts 8 may be provided with suitable resilient means 9 for returning the members or lids 8 to their normal position.

In the base of the receptacle, I have shown a removable basin 10 having a trap lid 11 pivoted to the basin. This trap lid is provided with a depending arm 12 adapted to be engaged by a drinking receptacle for the purpose of lifting the trap lid and moving the same from its normal position over the basin. This arm 12 may, also, serve as gravity weight means for returning the trap lid 11 to its normal position, although the return movement may be accelerated by suitable resilient means, such as spring actuated hinges 13. This basin is designed to contain a suitable antiseptic fluid, and is of sufficient depth to properly sterilize the drinking receptacles which may be passed through the basin. The basin 10 is provided with a suitable drainage port 14. Fluid may be supplied to the basin through a suitable cock 15, carried by a supply pipe 16, extending through the bottom 5 of the casing. Passing substantially central of the casing and mounted upon suitable journals in the walls 6 thereof is a shaft 17 provided with a hub 18 integral therewith. Radiating from this hub are a plurality of arms 19, each of which is adapted to support a suitable drinking receptacle, indicated at 20. In Figs. 1 and 2, this receptacle is shown fast with the arm 19, and the receptacle 20 is adapted to extend above the pivoted members or lids 8, whereby the contents may be easily accessible to an animal. In drinking fountains for animals, such as horses, the receptacle 20 would be of appropriate size and of sufficient strength for the purpose for which it is intended. However, should the fountain be designed for use by human beings, the receptacle 20$^a$ would be of the type illustrated in Figs. 3 and 4, in which the receptacle may be drawn away from the arms 19 to facilitate the drinking of the liquid.

In the constructions shown in Figs. 3 and 4, each arm 19 is provided with a seat 21 at or near the end thereof for the receptacle 20$^a$. These receptacles are shown provided with a rounded base 22 adapted to fit into the seat 21, and with a supporting shoulder 23 for maintaining the cup firmly upon the arm 19. To prevent the cup from being entirely removed from the fountain, I have connected each cup 20$^a$ to its respective arm 19 by a flexible connection 24, one end of which is secured to a resilient winding member 25, whereby when the cup is released from the grasp of a person, the resilient connection 24 will be wound upon a suitable spool by a coil spring, or any other suitable means, in member 25, to draw the receptacle 20$^a$ into its normal position on arm 19, as shown in Fig. 3.

The shaft 17 is provided with a suitable ratchet 26. Loosely mounted upon the shaft is a lever 27, having a handle 28 protruding beyond a wall 7 of the casing, and provided, also, with a dog 29 pivoted to the lever. This dog gravitates in the direction of the teeth of the ratchet 26 and operates, when the lever is reciprocated, to move the ratchet tooth by tooth and thereby move the drinking receptacles in a circular path within the casing. If desired, the lever may be returned to its at rest position by any suitable resilient means 30. The lever 27 is adapted to work in a suitable slot, not shown, within the end wall 7$^a$. Adjacent the lever 27 is a valve 31 connected to a suitable supply pipe, not shown, and this valve is provided with a spring plunger 32 adapted to be operated by the lever 27 when moved to its down position. This valve 31 controls the passage of fluid through a pipe 33 having branches 34, 35. The branch 34 of the pipe is provided with a nozzle 36 at the top of the casing, this nozzle operating to supply the drinking receptacles or cups with water. The other pipe 35 is provided with a spraying nozzle or rose 37 having its fluid ports so arranged that when a drinking receptacle is properly positioned opposite the nozzle 37, the jets of fluid will play upon both the inner and outer surfaces of the receptacle or cup.

It is desired to so position the receptacles or cups that when the lever 27 is moved to bring a cup 20 in register with the supplying nozzle 36, that another of said drinking receptacles shall be in the basin 10 containing the sterilizing fluid, and that another of the receptacles shall be positioned over the nozzle or rose 37 to receive the spray of cleansing fluid.

To prevent the fluid of spraying nozzle 37 from entering the basin 10, I have provided a trap lid 11, which is adapted to be raised out of position as each cup 20 passes out of the basin 10 toward the nozzle 37. Should any water overflow from the receptacle while being charged at nozzle 36, such overflow would have a tendency to run over the members 8 to the inclined or arcuate walls 7$^a$ and thereby be conducted from the casing. However, should it be desirable to further protect the basin from the overflow of water, a suitable shield 38 may be inserted to receive the overflow water from nozzle 36. This shield 38 may be of any desirable type, but is shown in the drawings as comprising two oppositely positioned members having an inclined bottom extending toward the path of the radial arms 19, to permit said arms to pass between the opposite members of the shield. This shield 38 may be provided with one or more apertures, indicated at 39, thereby permitting the water which may be collected by said shield to pass through the apertures 39 and flow along the walls of the casing 7 to a suitable port, indicated at 40, where the overflow water may be drawn off in any suitable manner.

In operation, assuming the cups to be in the position shown in Fig. 1, the depression of the handle 28 toward the valve 31 operates to move the cup positioned over nozzle 37 into alinement with nozzle 36, whereupon when the lever 27 is moved to its lowermost position, said lever will then press upon plunger 32 to open valve 31. As long as this lever is retained in this position, the water from nozzle 36 will flow into the receptacle adjacent to said nozzle, fluid from nozzle 37 will be sprayed on the interior and exterior surfaces of the cup adjacent the latter nozzle, and another of the drinking receptacles will be positioned within the basin 10 containing the antiseptic or sterilizing substance. Upon release of the lever, the resilient means 30 will operate to restore the lever to its initial position and shut off the supply of fluid to the nozzles 36 and 37. Should the cups 20ª be employed in lieu of the receptacles 20, the consumer is required to lift the cup from its sockets 22, after releasing the lever 27, in order to drink the contents of the cup. After the contents shall have been removed from the cup, the latter will automatically return to its initial position in the socket by reason of the action of spring 25 operating to take up the slack of the flexible connection 24, thereby precluding the liability of the cups being taken from the drinking fountain or becoming unseated and clogging parts of the mechanism.

I am aware that changes and modifications may be made in the details of construction herein shown and described, without departing from the spirit of the invention. The right is reserved, therefore, to make such changes as fairly fall within the scope of the appended claims.

Having thus described my invention, what I claim as new and desire to secure by Letters Patent is:—

1. In a drinking fountain comprising a rotary supporting member, a plurality of receptacles carried thereby, an antiseptic solution positioned in the path of the receptacles for treating the same antiseptically, a plurality of nozzles each coöperating with a receptacle, means for preventing escaping liquid from mixing with the antiseptic solution, and means operable at will for simultaneously discharging a fluid through said nozzles.

2. A drinking fountain comprising a casing, a plurality of nozzles carried thereby, a valve, means for discharging liquid through said nozzles directly from said valve, a rotary supporting member, a plurality of receptacles carried by the supporting member and coöperating with said nozzles, and a lever for simultaneously operating said valve and successively moving said receptacles in the path of each of said nozzles.

3. A drinking fountain comprising a casing, a rotary supporting member positioned therein, a plurality of receptacles mounted upon the supporting member, means positioned in the path of the receptacles for containing an antiseptic solution, a plurality of nozzles spaced apart for simultaneous coöperation with separate receptacles, a valve, and a lever adapted to operate means for controlling the passage of fluid through said nozzles and for successively moving said receptacles into the antiseptic solution and in juxtaposition to said nozzles.

4. A drinking fountain comprising a casing, a rotary supporting member positioned therein, a plurality of receptacles carried by said supporting member, means for maintaining an antiseptic solution in the path of the receptacles, a plurality of nozzles spaced for simultaneous coöperation with a plurality of receptacles, when another of the receptacles is positioned within the antiseptic solution, a valve controlling the passage of fluid through said nozzles, and a lever operating to open said valve for simultaneously discharging fluid through the nozzles and also to move said receptacles within the casing, whereby the various receptacles may be successively sterilized, washed and filled with a fluid by the operation of said lever.

5. In a drinking fountain, a rotary supporting member having a plurality of radiating arms, a receptacle removably mounted and normally seated upon the end of each of said arms, resilient means housed within each of said arms and adapted to continuously exert energy to restore the receptacle to its normal position, and flexible means connecting the cup with said resilient means.

6. In a drinking fountain, a rotary supporting member having a plurality of radiating arms, each provided with a seat, resilient means carried by each of said arms, a receptacle removably mounted upon each of said arms and provided with a base adapted to fit within said seat, and a flexible member connecting said cup with said resilient means, whereby when the cup is removed from its seat, said resilient means will operate to automatically return said cup to its seat.

7. In a drinking fountain, a plurality of cups relatively mounted therein, a basin positioned in the path of said cups and adapted to contain an antiseptic solution, a trap lid pivotally mounted on said basin, a plurality of nozzles coöperating with said cups, and means for deflecting the overflow of fluid from one of said nozzles away from said basin.

8. In a drinking fountain, a plurality of cups rotatably mounted therein, a receptacle adapted to contain a solution for treating the cups antiseptically, a deflector pivoted upon said receptacle and adapted to be moved out of operative position by the passage of cups through the receptacle, and means whereby said deflector is returned to its operative position.

In testimony whereof, I affix my signature, in presence of two witnesses.

WILLIAM C. WEST.

Witnesses:
FRANK LEFTWICH,
JOSEPH W. VAN WYE.